June 21, 1932.  P. FORKARDT  1,864,423
CHUCK
Original Filed Oct. 3, 1929

Inventor:
Paul Forkardt,
Att'y.

Patented June 21, 1932

1,864,423

UNITED STATES PATENT OFFICE

PAUL FORKARDT, OF DUSSELDORF, GERMANY

CHUCK

Application filed October 3, 1929, Serial No. 397,071, and in Germany January 21, 1929. Renewed November 30, 1931.

This invention relates to a so-called wedge chuck that is to say to a chuck in which the jaws are moved by means of wedge-shaped driving faces of a plunger centrally adjustable in the chuck. In known chucks of this kind, the engagement between the chuck jaws and the driving plunger has been effected by means of T-shaped slots with which engaged corresponding projections of the jaws or of the jaw holders. Owing to the T-shape of the slots, their exact manufacture as well as the changing of the jaws were rendered difficult.

These drawbacks are eliminated according to the invention by the engagement between the driving plunger and the chuck jaws or jaw holders, being effected by means of claw-shaped projections which are open at one side and engage with other like claws. These hook-shaped projections, open at one side, can be easily and accurately machined, and more particularly they can be exactly ground by means of large grinding wheels.

The hook shape of the connection claws further enables the chuck jaws or the jaw holders to be released from the driving plunger by a slight turning of the plunger in the chuck body. If the jaws or the jaw holders are guided in open radial slots, they can be simply radially withdrawn after a slight turning of the plunger. This also facilitates the cleaning of the chuck.

The driving of the driving plunger in the chuck according to the invention may be effected either by hand or by means of a driving medium such as for instance compressed air or oil under pressure, as in other known chucks.

A construction of a chuck according to the invention is shown by way of example in the accompanying drawing.

Figure 3:
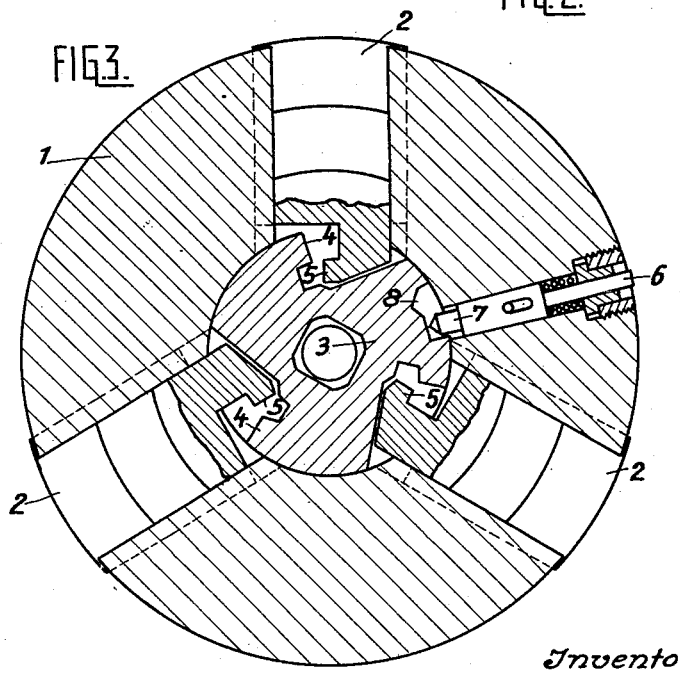
Fig. 3 is a view similar to Fig. 1 with the jaws out of engagement with the driving member.

In the chuck body 1, the jaws 2 are radially adjustable in the known manner in T-shaped slots. In the centre of the chuck body is arranged a plunger 3 which can be axially reciprocated by a rod 2'. At the end of the plunger are arranged in a regular or irregular manner, claws 4 which, as may be seen in Figure 3, are wedges inclined towards the axis of the chuck. The claws 4 engage claws 5 of the jaws 2, of the same wedge angle as the claws 4.

Figure 1:
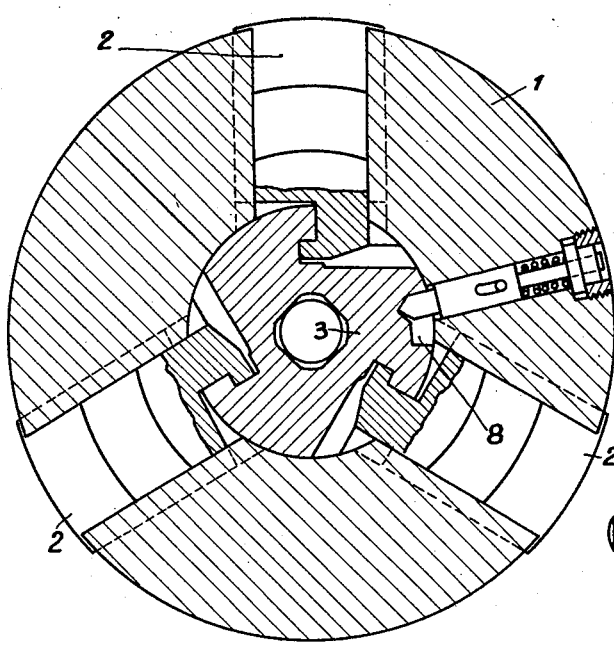
Figure 1 is a cross section through the chuck in which the jaws are shown partly in elevation. The jaws are in engagement with a driving member.
Figure 2:
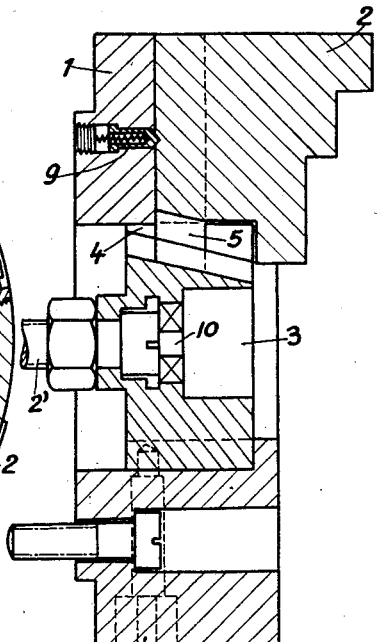
Figure 2 is a longitudinal section through the chuck.

By turning the plunger 3 about the axis of the chuck, the claws 4 and 5 can be brought into and out of engagement as shown in Figures 1 and 2. The point 7 of a spring-controlled pin 6 engages with a recess 8 in the edge of the plunger, which is made so deep at one end that when the claws 4, 5 are in engagement, the pin springs into a seat and locks the plunger in the engaged position. In the disengaged position, the pin is forced from its seating, and projects beyond the surface of the chuck, as shown in Figure 2, thereby indicating that the jaws 2 and the piston 3 are disengaged. Spring-controlled pins 9 are used in the same way for locking the jaws 2 in the disengaged position. A square hole 10 in the recessed front face, is used for turning the plunger and for throwing the jaws into and out of engagement, into which hole a turning key can be introduced.

The working of the chuck should be clear without any further description.

The advantages of the chuck can be summed up in the following:

1. The chuck can be easily cleaned without taking it to pieces, after withdrawing the jaws.

2. In changing from one job to another, the jaws can be changed directly in a few seconds. It is, therefore, no longer necessary to use extra jaws which are screwed on the original jaws.

3. In finishing the work blanks, it has been necessary hitherto each time to turn and to grind again the jaws used, as the required accuracy of the chucks was lost each time when taking them to pieces and fitting up again. On the contrary, the chuck and the jaws according to the invention can be made so accurately that the accurate jaws which are to be inserted for the finishing work, are held ready and can be used without any additional machining.

4. Owing to the easy interchangeability of the jaws, it is possible for the first time to use for small mass production work mechanical chucks, more particularly compressed air or pressure oil chucks.

5. The simple wedge fixing has already made possible a particularly accurate fixing. This advantage is still further increased by the possibility of exact machining of the claws 4 and 5.

What I claim is:

1. In a chuck, a body, jaws slidable radially in said body, a central driving plunger rotatable in said body, said jaws and said plunger having cooperating wedge shaped coupling claws open at one side thereon, whereby rotation of said plunger will couple and uncouple said chuck jaws to and from said plunger.

2. In a chuck, a body, jaws slidable radially in said body, a central driving plunger rotatable in said body, and cooperating wedge means actuated by rotation of said plunger on said plunger and on said jaws for coupling and uncoupling said jaws to and from said plunger.

3. In a chuck, a body, jaws slidable radially in said body, a central driving plunger rotatable in said body, said jaws and said plunger having cooperating wedge shaped coupling claws open at one side thereon, whereby rotation of said plunger will couple and uncouple said chuck jaws to and from said plunger, and spring controlled means in said body for locking said plunger in coupling position.

4. In a chuck, a body, jaws slidable radially in said body, a central driving plunger rotatable in said body, said jaws and said plunger having cooperating wedge shaped coupling claws open at one side thereon, whereby rotation of said plunger will couple and uncouple said chuck jaws to and from said plunger, spring controlled means in said body for locking said plunger in coupling position, and said jaws in uncoupled position.

In testimony whereof I affix my signature.

PAUL FORKARDT.